United States Patent [19]

Hsieh

[11] Patent Number: 4,863,886
[45] Date of Patent: Sep. 5, 1989

[54] MAGNESIUM OXIDE-SUPPORTED ZIEGLER CATALYST MODIFIED WITH ACID AND HIGHER ALKANOL, AND PROCESS FOR PREPARING NARROW MWD HDPE

[75] Inventor: John T. T. Hsieh, Warren, N.J.

[73] Assignee: Mobil Oil Corporation, New York, N.Y.

[21] Appl. No.: 139,213

[22] Filed: Dec. 29, 1987

[51] Int. Cl.$^4$ .................................................. C08F 4/64
[52] U.S. Cl. ..................................... 502/125; 502/111; 502/133; 526/124
[58] Field of Search ......................... 502/111, 125, 133

[56] References Cited

U.S. PATENT DOCUMENTS

| | | | |
|---|---|---|---|
| Re. 30,970 | 6/1982 | Hyde et al. | 502/125 X |
| 3,549,717 | 12/1970 | Itakura et al. | 502/125 X |
| 4,056,668 | 11/1977 | Berger et al. | 526/124 |
| 4,087,380 | 5/1978 | Hyde et al. | 502/111 |
| 4,110,523 | 8/1978 | Schweier et al. | 526/124 |
| 4,144,390 | 5/1979 | Derroitte et al. | 502/133 X |
| 4,167,493 | 9/1979 | Hsieh | 252/429 B |
| 4,288,578 | 9/1981 | Hsieh | 526/348.6 |
| 4,313,850 | 2/1982 | Kildahl et al. | 502/133 X |

OTHER PUBLICATIONS

Hsieh et al, application Ser. No. 139,212, filed Dec. 29, 1987.
Hsieh et al, application Ser. No. 139,220, filed Dec. 29, 1987.
Hsieh et al, application Ser. No. 111,944, filed Oct. 21, 1987.

*Primary Examiner*—Patrick P. Garvin
*Attorney, Agent, or Firm*—Alexander J. McKillop; Charles J. Speciale; Stanislaus Aksman

[57] ABSTRACT

MgO treated with an organic acid, e.g., 2-ethyoxybenzoic acid, is used as a support for an Al-Ti Ziegler catalyst in which the Ti component is the product of an alkanol having 5 to 12 carbon atoms and TiCl$_4$ to give HDPE with narrow MWD and large particle size for injection molding.

18 Claims, No Drawings

MAGNESIUM OXIDE-SUPPORTED ZIEGLER CATALYST MODIFIED WITH ACID AND HIGHER ALKANOL, AND PROCESS FOR PREPARING NARROW MWD HDPE

BACKGROUND OF THE INVENTION

High density ethylene homopolymers and copolymers (HDPE) with higher olefins are widely used in injection molding operations. Advantageously such resins should have a narrow molecular weight distribution (MWD) which is largely determined by the nature of the catalyst. The catalyst should also exhibit other desirable characteristics for commercial use. For example, the productivity of the catalyst should be as high as possible so that the resin will have a high ratio of polymer to catalyst residue. It is also very desirable that the catalyst result in a polymer having a large particle size, an advantage which is particularly sought in gas-phase polymerization. Another desirable characteristic of the catalyst is that it have a hydrogen response. A high hydrogen response means that small increases in the amount of hydrogen used in the reactor (to control molecular weight in the known manner) will result in substantial decrease in molecular weight and a higher melt index polymer. The need for excessive amounts of hydrogen decreases the reactor volume available for the ethylene and other comonomers, thereby reducing productivity.

My U.S. Pat. No. 4,167,493 which is incorporated herein by reference discloses the treatment of magnesium oxide with methanol, a Lewis base, prior to impregnation with a titanium compound and an aluminum compound to form a Ziegler catalyst which produces high density polyethylene with a narrow MWD suitable for injection molding.

The production of narrow MWD high density polyethylene using a magnesium oxide supported catalyst is also disclosed in my U.S. Pat. No. 4,288,578 which is incorporated herein by reference. The catalyst in this patent is made by impregnating a magnesium oxide support with a mixture of titanium tetrachloride and tetrabutyltitanate and then an organoaluminum compound reducing agent.

In accordance with this invention a MgO supported catalyst is treated with an organic acid (a Lewis acid), then with the product of $TiCl_4$ and a higher alkanol, and finally with an organoaluminum compound as a reducing agent. The catalyst is particularly suitable for preparing HDPE with narrow MWD and large particle size, excellent productivity and hydrogen response.

SUMMARY OF THE INVENTION

Magnesium oxide is treated with an organic acid, then with the product of 0.5 to 1.5 moles of an alkanol and one mole of $TiCl_4$, and finally with an organoaluminum compound as a reducing agent.

The catalyst is used in the polymerization of ethylene polymers and copolymers, particularly HDPE, having narrow MWD and large particle size.

DETAILED DESCRIPTION OF THE INVENTION

The initial treatment of the MgO support with organic acid is conducted with a molar excess of MgO. Preferably, the ratio of organic acid to MgO is from 0.001 to 0.5, most preferably from 0.005 to 0.1.

The organic acid is desirably an aromatic carboxylic acid, including substituted benzoic acid containing alkyl or alkoxy substitutes. Lower alkoxy substituted benzoic acid such as 2-ethoxybezoic acid has been demonstrated to be suitable. The acid is typically dissolved in an inert organic solvent such as hexane in which the MgO is refluxed.

After drying, the acid-treated MgO support is again treated in a similar manner with the product of an alkanol or polyhydroxy alkanol having 5 to 12 carbon atoms and $TiCl_4$ in a ratio of about 0.5 to 1.5, preferably about 0.8 to 1.2, moles of the alkanol per mole of $TiCl_4$.

After washing and drying the treated MgO based catalyst precursor is activated with an organoaluminum compound in the known manner.

Particularly suitable aluminum compounds have the formula $R_nAlX_{(3-n)}$ in which R is alkyl, alkenyl, alkylaryl or arylalkyl having 1 to 20 carbon atoms, X is hydrogen or halogen and n is 1, 2 or 3. Compounds in which R is alkyl of 1 to 6 carbon atoms are preferred.

Ethylene can be homopolymerized or copolymerized with higher olefins using the catalysts prepared according to the present invention, by any suitable process. Such processes include polymerizations carried out in suspension, in solution or in the gas phase. Gas phase polymerization reactions are preferred, such as those conducted in stirred bed reactors and, especially, fluidized bed reactors.

The molecular weight of the polymer is controlled in the known manner, by using hydrogen. With the catalysts produced according to the present invention, molecular weight may be suitably controlled with hydrogen when the polymerization is carried out at relatively low temperatures, e.g., from about 30° to about 105° C. This control of molecular weight may be evidenced by a measurable positive change in melt index ($I_2$) of the polymer produced.

The molecular weight distribution (MWD) of the polymers prepared with the catalysts of this invention, as expressed by the melt flow ratio (MFR) values ($I_{21}/I_2$), varies from about 20 to about 32, preferably about 21 to about 29, for HDPE products with a density of about 0.940 to about 0.965. As recognized by those skilled in the art, such MFR values are indicative of a relatively narrow molecular weight distribution of the polymer. As is also known to those skilled in the art, such MFR values are indicative of the polymers especially suitable for injection molding applications since the polymers having such MFR values exhibit relatively low amounts of warpage and shrinkage on cooling of the injection molded products.

The catalysts prepared according to the present invention are highly active and may have a typical activity of about 1000–5,000 grams of polymer per gram of catalyst per 120 psi of ethylene per hour.

The linear polyethylene polymers prepared in accordance with the present invention may be homopolymers of ethylene or copolymers of ethylene with one or more $C_3$-$C_{10}$ alpha-olefins. Thus, copolymers having two monomeric units are possible as well as terpolymers having three monomeric units. Particular examples of such polymers include ethylene/1-butene copolymers, ethylene/1-hexene copolymers, etylene/1-octene copolymers, ethylene/4-methyl-1-pentene copolymers, ethylene/1-butene/1-hexene terpolymers, ethylene/propylene/1-hexene terpolymers and ethylene/propylene/1-butene terpolymers. When propylene is employed as a comonomer, the resulting linear low density polyethylene polymer preferably has at least one other alpha-olefin comonomer having at least four carbon atoms in an amount of at least 1 percent by weight of the polymer. Accordingly, ethylene/propylene copolymers are possible, but not preferred. The most preferred comonomer is 1-hexene.

A commercially significant advantage of the catalysts of this invention is that of producing polymer particles of a relatively large size over 200 microns and usually over 300 microns.

A particularly desirable method for producing polyethylene polymers and copolymers according to the present invention is in a fluid bed reactor. Such a reactor and means for operating it are described by Levine et al, U.S. Pat. No. 4,011,382, and Karol et al, U.S. Pat. No. 4,302,566, the entire contents of both of which being incorporated herein by reference, and by Nowlin et al, U.S. Pat. No. 4,481,301.

The invention is illustrated by the following nonlimiting examples in which all parts are by weight unless otherwise specified.

EXAMPLE 1

Catalyst Preparation—Wet Method Using Pentanol

A 6.8 gram sample of MgO support (Merck-Maglite D) was dried in a 100-ml Schlenk flask under nitrogen at 250° C. for 16 hours without stirring. The MgO support was then slurried in 60 ml dry hexane in a 100-ml Schlenk flask and refluxed for 2 hours with 0.26 ml 2-ethoxybenzoic acid (2-EBA) at 0.01 2-EBA/MgO molar ratio. A dilute pentanol solution was prepared by adding 11.8 ml of pre-dried 1-pentanol (0.109 mole) to 10 ml of dry hexane in another flask. To avoid a rapid isotherm, 12 ml of neat $TiCl_4$ (0.109 mole) was added dropwise to the 1-pentanol solution to form the titanium compound solution. The (1:1 pentanol/$TiCl_4$) solution was immediately added to the 2-EBA treated MgO at room temperature. The slurry was refluxed at 70° C. for 16 hours and allowed to cool.

The catalyst precursor was washed six times with 60 ml of dry hexane. The solid was re-slurried with 60 ml of dry hexane, and 2.64 ml of 26 wt% tri-n-hexylaluminum (TNHAL) solution (1.636 mmole TNHAL) was slowly added (about three minutes) to form a catalyst having an Al/Ti ratio of 0.25. The catalyst was dried for 16 hours at 70° C. under nitrogen purge, to give a free-flow dark brown powder. Elemental analysis indicated that 1.34 mmoles/g of Ti was on the finished catalyst.

EXAMPLE 2

Catalyst Preparation—Total Deposition Method Using Pentanol

A 11.9 gram portion of MgO (Merck Maglite D-J824) was dried in a 3-neck-500-ml-round-bottom flask at 250° C. for 16 hours. While stirring with an overhead stirrer carrying a blade stirrer, 60 ml of dry hexane was added, 0.5 ml of 2-ethoxybenzoic acid was syringed in, and the slurry was refluxed for 2 hours. In another small Schlenk flask, 2.6 ml 1-pentanol and 10 ml dry hexane were mixed at room temperature, and 2.6 ml $TiCl_4$ was added dropwise to avoid a rapid exotherm. The solution was stirred for an additional 45 minutes to ensure complete reaction before it was syringed into the catalyst flask containing the treated MgO slurry. The slurry was refluxed at 70° C. for two hours and cooled to room temperature. Then, 4.6 ml (2.85 mole) of a 0.62M TNHAL solution in heptane was syringed in while stirring with a magnetic stirrer. The slurry was stirred for an additional hour to ensure completion of this pre-activation. The catalyst was dried under nitrogen purge at 70° C. for 16 hours to give a free-flow dark brown powder. Elemental analysis indicated that 1.31 mmole/g of Ti was on the finished catalyst.

EXAMPLE 3

Slurry Polymerization

A one gallon slurry reactor was purged with nitrogen at 90° C. overnight, cooled to room temperature, 1.8 cc of 25 weight % of di-isobutylaluminumhydride-heptane solution was injected into the reactor, and 0.42 gram of the catalyst of Example 1 was transferred to the reactor with 2 liters of hexane. While stirring, the reactor was heated to 90° C., maintained at 90° C., and 5 cc 1-hexene and 135 psi partial pressure of hydrogen were added to the reactor. Ethylene was fed continuously to the reactor to maintain the ethylene partial pressure at 135 psi for 80 min. The product was stabilized with 8.5 cc Irganox 1076 solution (500 ppm in hexane) and dried in a vacuum oven for 4 hours. The product was 335 grams of large mean-particle-size (greater than 400 microns), 10.9 $I_2$, 272 $I_{21}$, 25 MFR and 0.962 (g/cc) density polymer.

EXAMPLE 4

Slurry Polymerization

The polymerizations were run at 90° C. with 2 liters of polymerization-grade hexane. Approximately 0.4 gram of the catalyst of Example 1 (0.536 mmole Ti) and 1.8 ml di-isobutylaluminumhydride solution (25 wt. % in heptane) as cocatalyst (2.254 mmole Al), 5 ml 1-hexene comonomer, and 45 psia hydrogen were added in this order to the reactor. The polymerization was run at an ethylene partial pressure of 135 psia to give the HDPE products in Table I. The product was stabilized with 500 ppm Irganox 1076 stabilizer before drying in the vacuum oven for four hours at 65° C. Melt index ($I_2$), flow index ($I_{21}$), density, and melt viscosities (V30 and V300) were measured. The results are presented in Table I.

TABLE 1

| Example | Catalyst of Example | Density | MI | MFR | V30 | V300 | V30/V300 |
|---|---|---|---|---|---|---|---|
|  | Prior Art | 0.944 | 3.6 | 28.5 | 12989 | 5488 | 2.37 |
| 9 | 3 | 0.963 | 12.9 | 24 | 3196 | 2135 | 1.5 |

EXAMPLE 5

In a manner similar to that of Example 4 polymerization was conducted using the catalyst of Example 1 to determine the effect of the catalyst on median particle size of the polymer and the hydrogen response of the catalyst. The polymerization used a 1:1 molar ratio of hydrogen to ethylene. Results are reported in Table 2 which shows that the catalyst of Example 3 made with pentanol gives a high hydrogen response and a larger median particle size both of which are desirable.

TABLE 2

| Catalyst of Example | Polymer Density (g/cc) | Hydrogen Response ($I_2$) | MFR ($I_{21}/I_2$) | Polymer Median Particle Size (microns) |
| --- | --- | --- | --- | --- |
| 3 | 0.966 | 16.1 | 26 | 331 |

I claim:

1. A coordination-catalyst suitable for the polymerization of olefins comprising a titanium component and an organoaluminum compound reducing agent on a magnesium oxide support which has been pre-treated with a molar deficiency of a carboxylic acid with respect to the magnesium oxide support, in which the titanium component is the reaction product of an alkanol having 5 to 12 carbon atoms and $TiCl_4$, with the molar ratio of the alkanol to the $TiCl_4$ being about 0.5 to about 1.5.

2. The catalyst of claim 1 in which the carboxylic acid is an aromatic carboxylic acid.

3. The catalyst of claim 1 in which the carboxylic acid is a lower alkoxy substituted benzoic acid.

4. The catalyst of claim 1 in which the carboxylic acid is 2-ethoxybenzoic acid.

5. The catalyst of claim 1 in which the molar ratio of the alkanol to the $TiCl_4$ is 0.8 to 1.2.

6. The catalyst of claim 2 in which the molar ratio of the alkanol to the $TiCl_4$ is 0.8 to 1.2.

7. The catalyst of claim 3 in which the molar ratio of the alkanol to the $TiCl_4$ is 0.8 to 1.2.

8. The catalyst of claim 4 in which the molar ratio of the alkanol to the $TiCl_4$ is 0.8 to 1.2.

9. The catalyst of claim 1 in which the organoaluminum compound has the formula $$R_nAlX_{(3-n)}$$

in which R is alkyl, alkenyl, alkylaryl, or arylalkyl having 1 to 20 carbon atoms, X is hydrogen or halogen and n is 1, 2 or 3.

10. The catalyst of claim 5 in which the organoaluminum compound has the formula $$R_nAlX_{(3-n)}$$

in which R is alkyl, alkenyl, alkylaryl, or arylalkyl having 1 to 20 carbon atoms, X is hydrogen or halogen and n is 1, 2 or 3.

11. The catalyst of claim 8 in which the organoaluminum compound has the formula $$R_nAlX_{(3-n)}$$

in which R is alkyl, alkenyl, alkylaryl, or arylalkyl having 1 to 20 carbon atoms, X is hydrogen or halogen and n is 1, 2 or 3.

12. The catalyst of claim 1 in which the organoaluminum compound is tri-n-hexylaluminum.

13. The catalyst of claim 5 in which the organoaluminum compound is tri-n-hexylaluminum.

14. The catalyst of claim 8 in which the organoaluminum compound is tri-n-hexylaluminum.

15. The catalyst of claim 1 in which the molar ratio of the carboxylic acid to the magnesium oxide is 0.001 to 0.5.

16. The catalyst of claim 15 in which the molar ratio of the carboxylic acid to the magnesium oxide is 0.005 to 0.1.

17. The catalyst of claim 15 wherein the alkanol is an alkanol or polyhydroxy alkanol having 5 to 12 carbon atoms.

18. The catalyst of claim 17 wherein the alkanol is 1-pentanol.

* * * * *